United States Patent
Rengarajan

(12) 
(10) Patent No.: US 7,006,585 B2
(45) Date of Patent: Feb. 28, 2006

(54) RECOVERING DATA ENCODED IN SERIAL COMMUNICATION CHANNELS

(75) Inventor: Krishnan Santhana Rengarajan, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 740 days.

(21) Appl. No.: 10/029,842

(22) Filed: Dec. 31, 2001

(65) Prior Publication Data

US 2003/0123573 A1    Jul. 3, 2003

(51) Int. Cl.
*H03D 3/24*   (2006.01)

(52) U.S. Cl. .................. 375/326; 375/322; 375/324
(58) Field of Classification Search .......... 375/326; 714/701, 703, 799

See application file for complete search history.

(56) References Cited

U.S. PATENT DOCUMENTS

| 6,760,389 B1 * | 7/2004 | Mukherjee et al. ......... 375/326 |
| 2002/0031198 A1 * | 3/2002 | Eglit ........................ 375/355 |

* cited by examiner

*Primary Examiner*—Kevin Burd
*Assistant Examiner*—Freshteh N Aghdam
(74) *Attorney, Agent, or Firm*—Alan K. Stewart; W. James Brady, III; Frederick J. Telecky, Jr.

(57) ABSTRACT

A transition between values of two successive bits is detected. The bit after the transition is used as one of the recovered bits. A recovery circuit may independently generate a sampling clock based on an analog signal, and sample the analog signal at time points specified by the sampling clock to generate multiple data bits. A multiplexor is used to provide a bit after the transition instead of a bit generated by the recovery circuit. As all bits after transition are recovered, data encoded in an analog signal may be recovered accurately.

4 Claims, 2 Drawing Sheets

RECOVERING DATA ENCODED IN SERIAL COMMUNICATION CHANNELS

BACKGROUND OF THE INVENTION

1. Field of the Invention

The present invention relates to clock recovery circuits, and more specifically to a method and apparatus for recovering data in serial communication channels

2. Related Art

Data tokens (e.g., a bit representing one of two possible values) are often transmitted from one system ("sender system") to another ("receiver system") using serial communication channels. In general, each data token is encoded in a corresponding analog signal portion, and the analog signal portions are transmitted in successive time intervals forming the serial communication channel. The sequence of data tokens are then recovered at a receiving end by sampling the analog signal portions at appropriate time points.

In a typical recovery approach implemented in a receiver system, a sampling clock is generated which specifies the specific appropriate time points for sampling a signal received on a serial communication channel. An ideal sampling clock generally causes the signal portions to be sampled in the center of (or within) a "data eye" portion in which the signal level closely represents an encoded data token.

One problem often encountered in data recovery is loss of data tokens, i.e., a data token encoded in an analog signal portion may not be recovered. The loss is often due to the inaccuracies in the generation of a sampling clock used to sample the signal received on a serial communication channel. The inaccuracies in turn are caused by factors such as jitter (short term disturbances), as is well known in the relevant arts.

Data loss generally leads to undesirable results, typically specific to the environment in which the data tokens are used. For example, in networking environments, a receiver system may request retransmission of a large data unit (e.g., packet) containing the unrecovered data, leading to unneeded retransmission overhead and potential slow-down of the end applications using the transmitted data. As another example, in display environments, loss of data representing a portion of an image frame may lead to poor image quality.

Therefore, what is needed is a method and apparatus to accurately recover data in serial communication channels.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention allows the accurate recovery of a sequence of data tokens transmitted over serial communication channels. The feature is achieved by detecting transitions in the values of a pair of successive data tokens, and providing one of the two data tokens as a recovered data token. Due to such an approach, at least the data tokens having a different value from a corresponding adjacent token (in a sequence), are accurately recovered. In addition, the various timing signals can be re-timed depending on the specific implementation.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
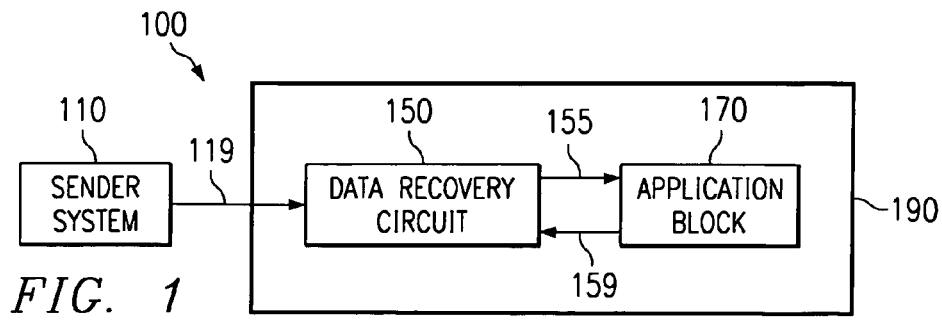
FIG. 1 is a block diagram illustrating the details of an example environment in which the present invention can be implemented.

FIG. 1 is a block diagram illustrating the details of an example environment in which the present invention may be implemented. System 100 is shown containing sender system 110, serial communication channel 119 and receiver system 190. Each component is described in further detail below.

Sender system 110 encodes a sequence of data tokens in an analog signal, and transmits the analog signal over serial communication channel 119. Sender system 110 encodes data tokens using a clock signal of a specified frequency (e.g., 622 MHz, 1.28 GHZ, etc). In an embodiment described below, each token represents a bit having one of two possible values.

Serial communication channel 119 may be supported by any physical medium as is well known in the relevant arts. The analog signal generated by sender system 110 is transmitted on serial communication channel 119 to receiver system 190.

Receiver system 190 is shown containing data recovery circuit 150 and application block 170. Data recovery circuit 150 recovers the sequence of data tokens encoded in an analog signal received on serial communication channel 119. The recovered data tokens may be provided to application block 170 on path 155 using clock signal 159. Application block 170 uses the recovered data tokens to execute a user application, and may be implemented in a known way.

As described in the previous sections, a prior clock recovery circuit may lose data tokens if the encoded data is not sampled in the appropriate time points. The manner in which data recovery circuit 150 may prevent such loss is described below.

3. Method

Figure 2:
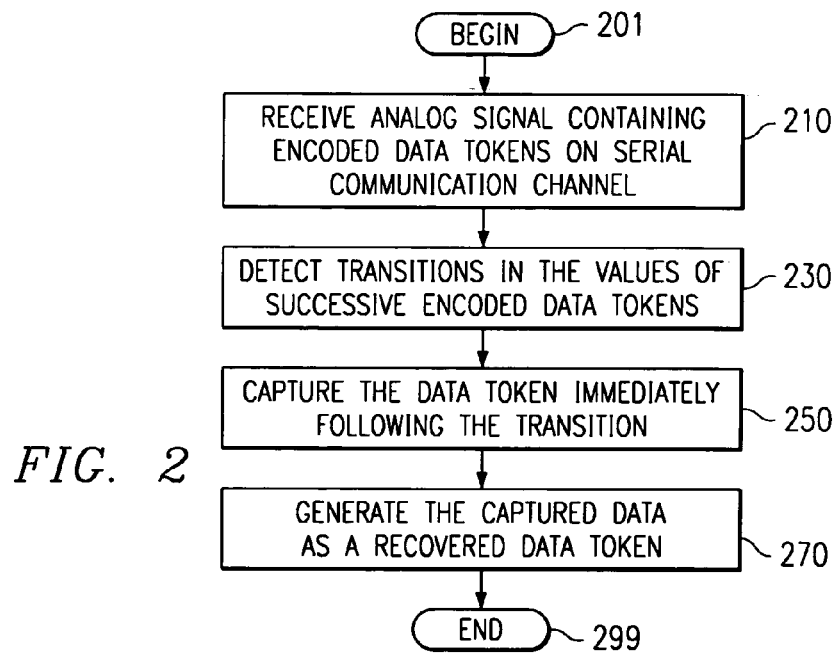
FIG. 2 is a flow chart illustrating a method to recover data according to an aspect of the present invention.

FIG. 2 is a flow-chart illustrating a method using which the data can be recovered from a serial communication channel. The method is described with reference to data recovery circuit 150 of FIG. 1 for illustration. The method can be implemented in other environments as well. The method begins in step 201, in which control immediately passes to step 210.

In step 210, an analog signal containing a sequence of encoded data tokens is received over a serial communication channel. The analog signal may be received in a known way.

In step 230, a transition (change) is detected in the values of a pair of successive encoded data tokens. In step 250, the data token immediately following the transition is captured. The data thus captured may be referred to as new data.

In step 270, the new data is generated as a recovered data token. As all the data tokens after transitions are captured as recovered data tokens, the data token may not be lost.

Several different embodiments may be implemented using the approach described above. In general, the implementations need to take into consideration various timing constraints and transient conditions. An example implementation which addresses some of the timing constraints and transient conditions is described below.

4. Data Recovery Circuit

Figure 3:
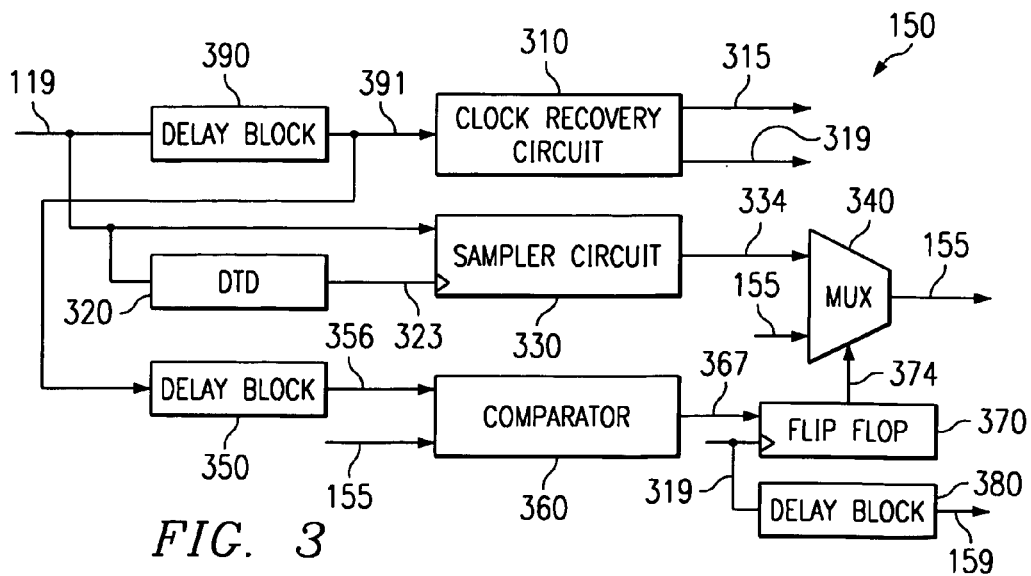
FIG. 3 is a block diagram illustrating the details of an embodiment of data recovery circuit implemented in accordance with the present invention.

FIG. 3 is a block diagram illustrating the details of an embodiment of data recovery circuit 150 which recovers the data bits encoded in a serial communication channel. Data recovery circuit 150 is shown containing clock recovery circuit 310, data transition detector 320, sampler 330, multiplexor 340, delay blocks 350, 380 and 390, comparator 360, and flip flop 370. Each component is described in further detail below.

Delay block 390 delays the input analog signal 119 and provides the delayed signal (391) as input to clock recovery circuit 310. The extent of delay may be determined to enable the input on path 334 to be provided ahead of a transition on select signal 374. Thus, in the embodiment of FIG. 3, the delay is greater than or equal to the larger of (1) delay introduced in the path of DTD-320, sampler 330; and (2) delay introduced by delay block 350, comparator, and flip-flop 370.

Clock recovery circuit 310 generates bits by sampling analog signal 391 (DIN) at time points specified by an internally generated sampling clock (not shown), and the generated bits are provided on line 315. It may be noted that the data (on 315) recovered directly according to the sampling clock by clock recovery circuit 310 is ignored (but the desired data is recovered) in the described embodiment. The ignored data could be erroneous, particularly in the presence of a high amount of jitter in input clock signal 119.

Line 319 contains a clock signal generated from the sampling clock. In an embodiment, a delayed and inverted sampling clock is provided on line 319. The introduced delay may equal the delay of the sampled data with respect to the sampling clock. The delay generally maximizes the timing margins (e.g., set/hold times for a flip flop) for the succeeding sampling circuit. The inversion facilitates succeeding (following) circuits to sample the data with an appropriate edge (rising/falling). Clock recovery circuit 310 may be implemented in a known way.

Data transition detector (DTD) 320 generates a pulse on line 323 when a transition is present in the analog signal on line 119. The generated pulse is used to clock (on line 323) sampler 330. The delay introduced by DTD 320 determines the pulse width on line 323. The pulse width should generally support the set up time requirements of the sampler 330.

It may be further noted that due to the operation of delay block 390, DTD 320 receives an early version of analog input signal compared to clock recovery circuit 310, and accordingly the signal on line 119 is referred to as EARLY_DIN 119. The early reception provides sufficient time for the detection of new data based on transitions, without having to change a conventional implementation of clock recovery circuit.

Sampler circuit 330 samples analog signal 310 at a time specified by a pulse received on line 323. As a result, the data following each transition is sampled and stored in sampler 330. The stored bit is generated as the next new bit on line 334. It may be appreciated that sampler 330 captures a second (later) one of a pair of data token between which a transition is detected by DTD 320. Sampler circuit 330 may be implemented using analog components in a known way.

Due to the operation of DTD 320 and sampler circuit 330, the data samples following a transition may be captured by (stored in) sampler circuit 330. The capture would be independent of any clock, and thus all the data samples may be captured in sampler circuit 330. Comparator 360 and flip-flop 370 determine whether to provide the captured sample as a recovered sample as described below.

Multiplexor 340 selects either the next new bit generated on line 334 or the bit generated on line 155 (by multiplexor 340) in a previous clock cycle under the control of select signal 374. When select signal 374 is asserted to a high logical value, multiplexor 340 selects the next new bit received on line 334, else the bit generated (on line 155) in the previous clock cycle is selected. The manner in which select signal 374 is generated is described below.

It should be understood that alternative embodiments may be implemented in which multiplexor 340 is provided samples received on line 315 as inputs (instead of final samples generated on path 155). In such a situation, the timings of various signals may need to be modified. The implementation of such alternative embodiments will be apparent to one skilled in the relevant arts based on the disclosure provided here, and the implementations are contemplated to be within the scope and spirit of the present invention.

Delay block 350 delays the input analog signal, and the resulting delayed signal (356) is provided to comparator 360. The extent of the delay (F) equals the time delay between a rising edge of the sampling clock and a falling edge of CLKOUT 319. The signal on line 356 is referred to as DELAYED_DIN.

Comparator 360 compares the bit received on line 356 with the present sample generated by multiplexor 340 to generate a signal (IS-NEW-DATA) on line 367. IS-NEW-DATA signal 367 may have one logic state (e.g., a high state) to indicate the two inputs to comparator 360 are different and another logic state (logic low) to indicate the two inputs are equal.

Flip flop 370 clocks out IS-NEW-DATA signal 367 at the falling edge of CLKOUT 319. Accordingly, flip-flop 370 is shown receiving IS-NEW-DATA signal 367 as a data input, and is clocked by the falling edge of CLKOUT 319. As select line 374 controls the selection operation of multiplexor 340, the recovered bits are caused to be provided by the falling edge of CLKOUT 319.

In addition, DOUT_FINAL 155 may need to be aligned with the falling edge of CLKOUT_FINAL signal on line 159. To achieve the alignment, CLKOUT signal 319 is provided to delay block 380 to generate CLKOUT_FINAL on line 159. The amount of delay may equal the propagation delay of flip flop 370 and multiplexor 340. The rising edge of CLKOUT_FINAL 389 occurs in the center of DOUT_FINAL on line 159.

Using the embodiment(s) of FIG. 3, the encoded bits can be recovered accurately without the loss of bits as described in the earlier sections. The description is continued with reference to a timing diagram illustrating the various signals used and generated by clock recovery circuit during operation.

5. Timing Diagram

Figure 4:
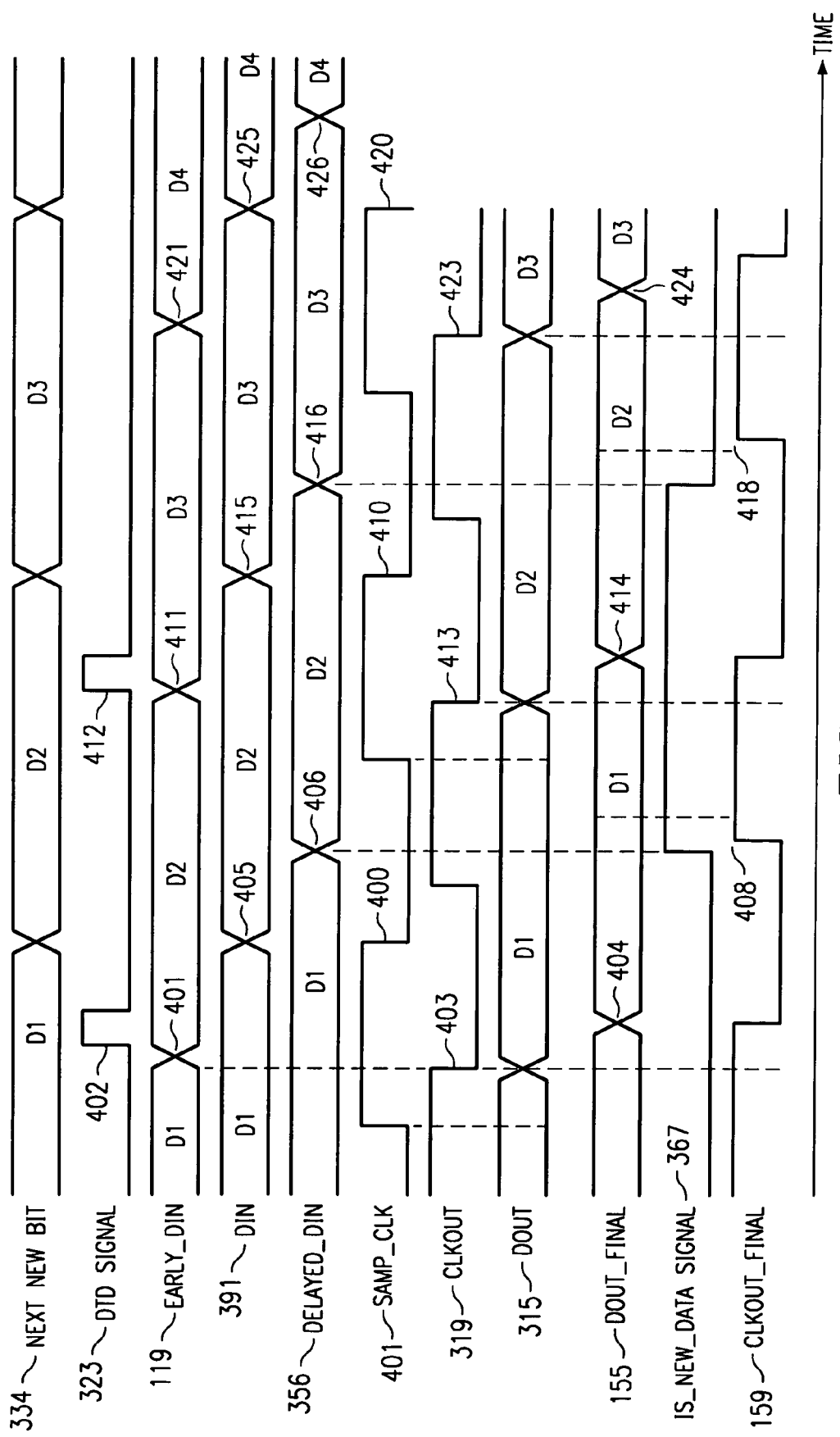
FIG. 4 is a timing diagram of various signals illustrating the details of operation of an embodiment of data recovery circuit.

FIG. 4 is a timing diagram illustrating the various signals used and generated by clock recovery circuit 300 during operation. There are shown input analog signal (DIN) 391, early version of analog input signal (EARLY_DIN) 119, delayed version of analog input signal (DELAYED_DIN) 356, SAMP_CLK 401, CLKOUT 319, DOUT 315, DTD signal 323, next new bit signal 334, IS-NEW-DATA signal 367, DOUT_FINAL 155 and CLKOUT_FINAL 159.

EARLY_DIN 119 is shown with bits D1–D4 (with bit boundaries at 401, 411 and 421 respectively), and transitions are assumed to be present at time points 401 and 411 for illustration. DTD signal 323 is shown containing transitions starting at time points 402 and 412, which are respectively after time points transitions 401 and 411. The boundaries 401, 411 and 421 are shown shifted to time points 405, 415 and 425 on DIN 391, and to time points 406, 416 and 426 on delayed_DIN 356.

The rising edges of SAMP_CLK 401 is at the center of bits D2 and D3 of DIN 391 as shown at points 410 and 420 respectively. Similarly, CLKOUT 319 has falling edges at the end of bits D1 and D2 of DOUT 315 as shown at points 413 and 423. The time delay that exists between points 410 and 413 (or 420 and 423) is referred to as 'F' described in the previous section.

DTD signal 323 is shown containing pulses starting at time points 402, 412 and 422 respectively corresponding to transitions at points 401, 411 and 421. The bits immediately following the transitions, i.e., D2, D3 and D4 may then be generated as the corresponding next new bit by sampler 330 as shown on next new bit signal 334 starting after points 405, 415 and 425 respectively.

IS-NEW-DATA 367 is shown going high at point 406 as D1 (on DOUT_FINAL 155) is different from D2 (on DELAYED_DIN 356). Thus, the next bit generated at time point 414 on DOUT_FINAL 159 is D2. IS-NEW-DATA signal 367 is shown going low at point 416 (as D2 equals D3), thus next bit generated at point 424 on DOUT_FINAL 159 is D2 (or D3).

CLKOUT_FINAL 159 is generated after delaying CLKOUT 319 by an amount of time such that the rising edges of CLKOUT_FINAL 159 is at the center of bits D1, D2 and D3 of DOUT_FINAL 159 as shown at points 408 and 418 respectively. The amount of time delayed between CLKOUT 319 and CLKOUT_FINAL 159 is illustrated between points 413 and 414.

It may be noted that the timing diagram of FIG. 4 illustrates the timings of various signals when the input analog signal (early-DIN 119) is jitter-free. However, it should be understood that circuits implemented according to various aspects of the present invention are suitable to accurately recover encoded data tokens even in the presence of a high degree of jitter. Such a feature may be achieved because data tokens are determined based on transitions as described above. The description is continued with reference to general timing considerations.

6. Timing Considerations

In an embodiment according to FIG. 3, CLKOUT 319 is delayed with respect to sampling clock 401 to maximize the margins (set up/hold) of any subsequent (in relation to clock recovery circuit 310) sampling circuit as is well known in the relevant arts. Polarity changes (inversion) as required by subsequent sampling circuits may be implemented such that the edge of the sampling clock is centered on 315. For example, if the rising edge of 319 is used by the subsequent circuits for clocking data received on path 315, and rising edge of sampling clock was used to sample DIN 391 by clock recovery circuit 310, then CLKOUT 319 may need to be inverted (and delayed as above) form of the sampling clock. The timing diagram in FIG. 4 depicts such as example.

In the description of the above section, such delay (e.g., between time point 410 on sampling clock 401 and time point 413 on CLKOUT 319) is denoted by "F" time units. In an embodiment, F equals 180 pS representing the worst case minimum possible considering various parameters. In general, the value of F varies with manufacturing technology voltage, temperature conditions, etc. Thus, it may be appreciated that there is a retiming by "F" in clock recovery circuit 310 such that the edge (rising, in this case) of the sampling clock of 319 is centered on 315. This means that the falling edge of 319 aligns with the transition of 315.

As a result of the above implementation considerations, data on path 315 is provided at the falling edge of the recovered clock CLKOUT 319. Any subsequent circuit can sample the data on the rising edge of the recovered clock.

IS_NEW_DATA signal 367, which indicates whether current data token is different from a previous data token, may need to be evaluated earlier (by the set up-time of flip flop 370) than the falling edge of 319, such that this information (on change of value) can be provided on select line 374 at the arrival of the falling edge of 319.

One scenario in which a prior clock recovery circuit 310 can fail is when transitions on DIN 391 are close to the sampling edge of sampling clock in 310 so as to violate the set-up time of the sampler (not shown, within clock recovery circuit 310). Such a situation often happens due to two reasons: (1) jitter on input data 391; and/or (2) resolution (accuracy in positioning) of the sampling clock generated internally by clock recovery circuit 310.

The effect of the set up-time violation is that the transition in data input may not be recognized and the output is not updated with the changed value of the data. That is, the corresponding data token may be lost. In this scenario, the delay between DIN 391 and falling edge of CLKOUT 319 would be the same as the delay between the sampling clock (401) of 310 and the falling edge of 319, which is F (assuming a set up time of zero nano seconds).

It may be readily appreciated that the recovery approach according various aspects of the present invention can recover the data tokens in the situation of above (as the transition would be detected and the data token generated as a recovered token). If the total propagation delay of delay block 350 and comparator 360 is less than or equal to (F-set up time of flip-flop 370), then the requirement that IS_NEW_DATA 367 be evaluated before the falling edge of CLKOUT 319 may be met. Thus the design of delay block 350 and comparator 360 may need to be implemented meeting this criteria. The parameter F can be designed in so as to meet this criteria as well.

Another scenario when clock recovery circuit 310 may not recover a data token is when there is a violation of the hold time of the sampler (not shown, within clock recovery circuit 310). The violation may also occur for reasons similar to those described above with respect to the previous scenario. The effect of the hold-time violation is that the transition in data input that corresponds to the next token, and the next token is prematurely recognized. That is, the output data is corrupted.

According to one approach employed with reference to FIG. 3, IS_NEW_DATA 367 is not updated prematurely. Such a result is achieved by using delay block 350 before comparator 360. To appreciate the result, it may be helpful to first appreciate that D1 to D2 change in 391 before the transition of sampling clock at time point 410 is a valid change. However, a change in 391 after time point 410 may need to be construed as a D2 to D3 change (next token).

Accordingly, such changes may not be recognized or processed for setting up IS_NEW_DATA 367 before the falling edge of 319 at time 413. This can be done by delaying DIN 391 such that all changes in DIN 391 arrive at 367 late enough with respect to transition at time point 413 on 319, so as not to be recognized as a transition by the flipflop 370. The delay in the arrival of the change in 391 needs to be such that it arrives hold-time (of 370) later from transition 413 on 319. That is, the hold time is NOT violated. If violated, then it might be recognized, which is not desirable.

Hence a D1 to D2 transition that arrived at 367 set up time before time point 413 would be recognized by flip-flop 370 (discussed earlier), whereas a D2 to D3 transition (if D2 is not equal to D3) occurring hold-time after 413 will not be recognized. The combined delay of delay block 350 and comparator 360 form the delay from 391 to 367.

Delay block 350 has apparently two contradictory requirements: (1) The combined delay of delay block 350 and flip flop 360 should be such that the change in DIN 391 appears at 367 a set up-time before 413. Given that the change in 391 can appear as late as 410 (data is jittered by the maximum amount), and there is time "F" available between 410 and 413, the combined delay of delay block 350 and comparator 360 may need to meet a maximum bound criterion: delay should be less than or equal to (F-set up-time). (2) Delay block 350 delays changes in 391 after transition 413 (as discussed above). This sets a minimum bound for the combined delay of blocks 350 and 360.

In an embodiment, both of these bounds are met by designing the hold time of flip-flop 370 to be negative. As a result, the data 367 can change earlier by the hold-time magnitude, and still not affect the output 374 of the flip flop 370. Thus, a circuit may be implemented to reliably recover the bits (data tokens) encoded in an analog signal transmitted on a serial communication channel.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A data recovery circuit for recovering a sequence of data tokens encoded in an analog signal, said data recovery circuit comprising:

a data transition detector (DTD) circuit detecting a transition in said analog signal;

a sampler circuit sampling said analog signal to generate a sample data token, said sampler circuit sampling said analog signal responsive to the detection of said transition;

a multiplexor providing said sample data token instead of another data token as one of said sequence of data tokens;

wherein said sample data token is received after said transition in said analog signal;

a recovery circuit receiving said analog signal and generating a clock-out signal delayed in phase from a sampling clock signal, wherein said sampling clock signal is based on said analog signal; and wherein said recovery circuit generates a clock-out clock signal having rising edges approximately at the center of said first plurality of data tokens, said data recovery circuit further comprising:

a second flip-flop receiving a IS NEW DATA signal indicating whether present data token generated by said multiplexor is not equal to a data sample presently received on said analog signal, said second flip-flop being clocked by a falling edge of said clock-out clock signal such that said IS NEW DATA signal provided on said falling edge as a select signal for said multiplexor; and a delay block receiving said clock-out clock signal and delaying said clock-out clock signal by an amount equaling propagation delays caused by said second flip-flop and said multiplexor, said data recovery circuit providing the output of said delay block and the output of said multiplexor as said sequence of data tokens and a corresponding clock signal respectively.

2. The data recovery circuit of claim 1, wherein each of said sequence of data tokens comprises a bit.

3. A system recovering a sequence of data tokens encoded in an analog signal, said system comprising:

a data recovery circuit for recovering said sequence of data tokens, said data recovery circuit comprising:

a data transition detector (DTD) circuit detecting a transition in said analog signal;

a sampler circuit sampling said analog signal to generate a sample data token, said sampler circuit sampling said analog signal responsive to the detection of said transition; and a multiplexor providing said sample data token instead of another data token as one of said sequence of data tokens; an application block receiving and using said sequence of data tokens;

wherein said sample data token is received after said transition in said analog signal;

a recovery circuit receiving said analog signal and generating a clock-out signal delayed in phase from a sampling clock signal, wherein said sampling clock signal is based on said analog signal; and wherein said recovery circuit generates a clock-out clock signal having rising edges approximately at the center of said first plurality of data tokens, said data recovery circuit further comprising:

a second flip-flop receiving a IS NEW DATA signal indicating whether present data token generated by said multiplexor is not equal to a data sample presently received on said analog signal, said second flip-flop being clocked by a falling edge of said clock-out clock signal such that said IS NEW DATA signal provided on said falling edge as a select signal for said multiplexor; and a delay block receiving said clock-out clock signal and delaying said clock-out clock signal by an amount equaling propagation delays caused by said second flip-flop and said multiplexor, said system providing the output of said delay block and the output of said multiplexor as said sequence of data tokens and a corresponding clock signal respectively.

4. The system of claim 3, wherein each of said sequence of data tokens comprises a bit.

* * * * *